United States Patent [19]
Vanden Heuvel et al.

[11] Patent Number: 5,751,723
[45] Date of Patent: May 12, 1998

[54] METHOD AND SYSTEM FOR OVERHEAD BANDWIDTH RECOVERY IN A PACKETIZED NETWORK

[75] Inventors: Dean Paul Vanden Heuvel; Brent Matthew McKay, both of Chandler; James Morris Tooker, Phoenix, all of Ariz.

[73] Assignee: Motorola, Inc., Schaumburg, Ill.

[21] Appl. No.: 673,888

[22] Filed: Jul. 1, 1996

[51] Int. Cl.$^6$ ................................ H04J 3/08; H04J 3/12
[52] U.S. Cl. ..................... 370/528; 370/529; 370/523; 370/504
[58] Field of Search ................... 370/392, 426, 370/468, 470, 471, 473, 474, 522, 528, 529, 523, 505, 504, 527

[56] References Cited

U.S. PATENT DOCUMENTS

| | | | |
|---|---|---|---|
| 5,227,907 | 7/1993 | Rao et al. | 370/528 |
| 5,511,065 | 4/1996 | Yonehara | 370/528 |
| 5,570,361 | 10/1996 | Norizuki et al. | 370/528 |

Primary Examiner—Wellington Chin
Assistant Examiner—Soon-Dong Hyun
Attorney, Agent, or Firm—Walter W. Nielsen

[57] ABSTRACT

In a packet network, message packets (130) are comprised of vacant or unused bits for future system enhancements or for remedying unknown design oversights or utilizing vacant portions of fixed length data packets. Furthermore, message packets (130) comprise a message type identifier distinguishing message architecture. A transmit and receive packet network node (100) maintains an unused bit catalog (125) listing vacant or unused bits of particular message packet types. When a message packet type having vacant or unused bits is detected propagating through the packet network, background data is retrieved from a transmit background data queue (115) and interleaved into such message packets to form enriched message packets (130') for transportation through the packet network. Receiving packet network nodes (100) detect enriched message packets (130') and extract and buffer the background data. A lower datarate background data transfer mechanism is maintained without impacting the performance of the existing packet network.

20 Claims, 3 Drawing Sheets

METHOD AND SYSTEM FOR OVERHEAD BANDWIDTH RECOVERY IN A PACKETIZED NETWORK

FIELD OF THE INVENTION

This invention relates generally to the field of digital communication systems and, more specifically, to methods and systems that provide background message delivery to users of such systems.

BACKGROUND OF THE INVENTION

Digital communication systems frequently partition data streams into packets or messages to accommodate intermittent or multiplexed transfer of serial data. Retransmission or rerouting may also be accommodated when portions of data streams are partitioned and packaged. Packetized data carries with it rigid structure or format such as headers and payload portions. Headers may have fields that describe message types, message or system status, sequence numbers for proper post-transmission ordering of data, and payload length, to name a few. Payload portions of data packets primarily carry raw data, but they may also have check words, such as error detection and/or correction information appended to them.

In digital communication systems, data packet formats or structures must be defined early in the development of such systems, and packet formats must be strictly adhered to, as such formats impact hardware and software design. To accommodate unexpected but imminent design changes, packet formats are frequently "padded" with data fields or bits that, at the time of definition, have no known present function, but that may be used to fix original design oversights or accommodate future system enhancements.

These unused fields or bits are seldom extracted from the final system design, as redesign costs of hardware and software may be prohibitive and impractical. Since unused bits or fields are frequently frozen into a design, each transmission of unused bits is non-revenue producing, as system providers charge only for the data transmitted. Also, systems may be designed with fixed packet sizes that transfer variable length data messages having unused payload portions. Also, since digital communication systems are bandwidth limited, revenues are directly impacted by inefficient transmission of unused bits.

Furthermore, transmission of small amounts of data may be cost prohibitive for some users, as a transfer of data requires reservation and usage of revenue generating payload data portions of data packets. In fact, some users may have data to transmit that may not require immediate delivery and may tolerate latency in delivery.

Thus, what is needed is a method and system for recapturing overhead bandwidth, (i.e., unused bits) from data packet formats in an existing packet communication system.

What is also needed is a method and system for conveying and recovering background data over an existing packet network without impacting the present design and configuration of the existing packet network.

What is yet needed is a method for selecting message packets from which to recover bandwidth augmented background data.

BRIEF DESCRIPTION OF THE DRAWINGS

The invention is pointed out with particularity in the appended claims. However, a more complete understanding of the present invention may be derived by referring to the detailed description and claims when considered in connection with the figures wherein:

Figure 1:
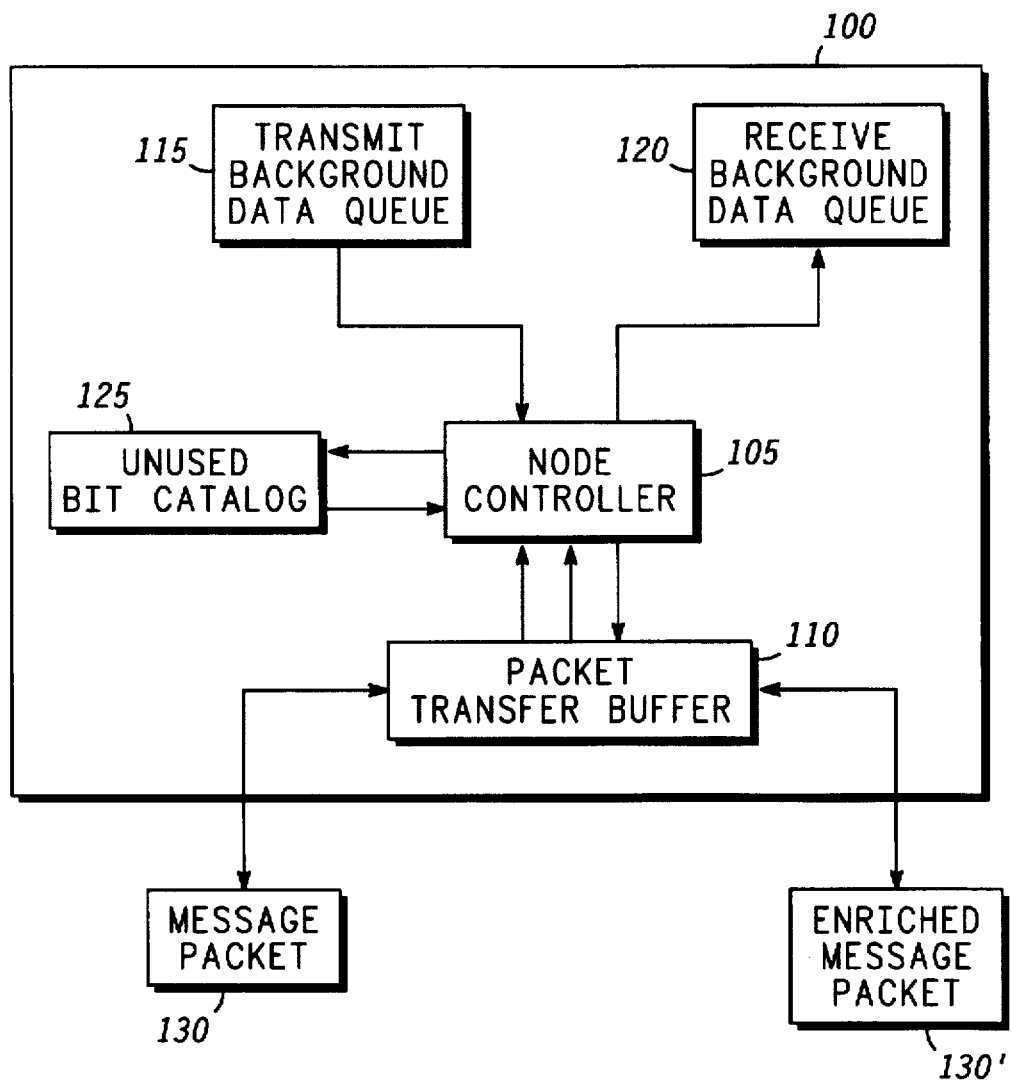
FIG. 1 illustrates a simplified block diagram of a packet network node in accordance with a preferred embodiment of the present invention.

The exemplification set out herein illustrates a preferred embodiment of the invention in one form thereof, and such exemplification is not intended to be construed as limiting in any manner.

DETAILED DESCRIPTION OF THE DRAWING

The present invention provides, among other things, a system and method for conveying and recovering background data over a packet network wherein each message packet has a format denoted by a packet type identifier and wherein a portion of the message packets denoted by the message packet identifiers have at least one unused or reserved bit. The system and method include monitoring each message packet to determine a packet type identifier, and interleaving a portion of background data (i.e., additional revenue generating data) into the unused or reserved bit locations to form an enriched message packet when a packet type identifier corresponds to a packet type having an unused or reserved bits. The existing packet network transports the enriched message packet to a receiving packet network node for extracting the portion of background data from the originally unused bits of the enriched message packet.

The present invention further provides a method and system for addressed transmission and distribution of background data. Distribution is accomplished by sorting background data according to a destination identifier denoting one of a plurality of receiving packet network nodes, queuing the background data into separate queues according to destination identifiers, and interleaving the background data corresponding to a specific destination node when a message packet bearing a corresponding destination identifier is detected.

FIG. 1 illustrates a simplified block diagram of a packet network node in accordance with a preferred embodiment of the present invention. A packet network node 100 operates in a packet network as a sending, receiving, or transmission node. Packet network node 100 may be any form of data terminal for operating on packetized data, such as voice, data, or video.

When packet network node 100 operates in a transmit mode, packet network node 100 receives message packet 130 into a packet transfer buffer 110 for evaluation. Packet transfer buffer 110 temporarily delays transmission of message packet 130 to determine a packet type identifier. A packet type identifier commonly denotes structural characteristics of a message packet such as locations and lengths of fields. In the present invention, the location and quantity of unused or reserved bits may be deduced from indexing an unused bit catalog 125 using the message identifier of message packet 130.

Unused bit catalog 125 comprises a pre-processed list of message identifiers with a location or a mask of unused, and hence available, bits of message packet 130. Unused bit catalog 125 may be structured as an indexed list denoting available or vacant bits for each type of message packets, distinguished by a packet identifier, and it is employed both for identifying vacant bits for interleaving background data, and for identifying bits that have been "enriched" in an enriched message packet 130' and that carry portions of background data yet to be extracted and buffered.

Figure 2:
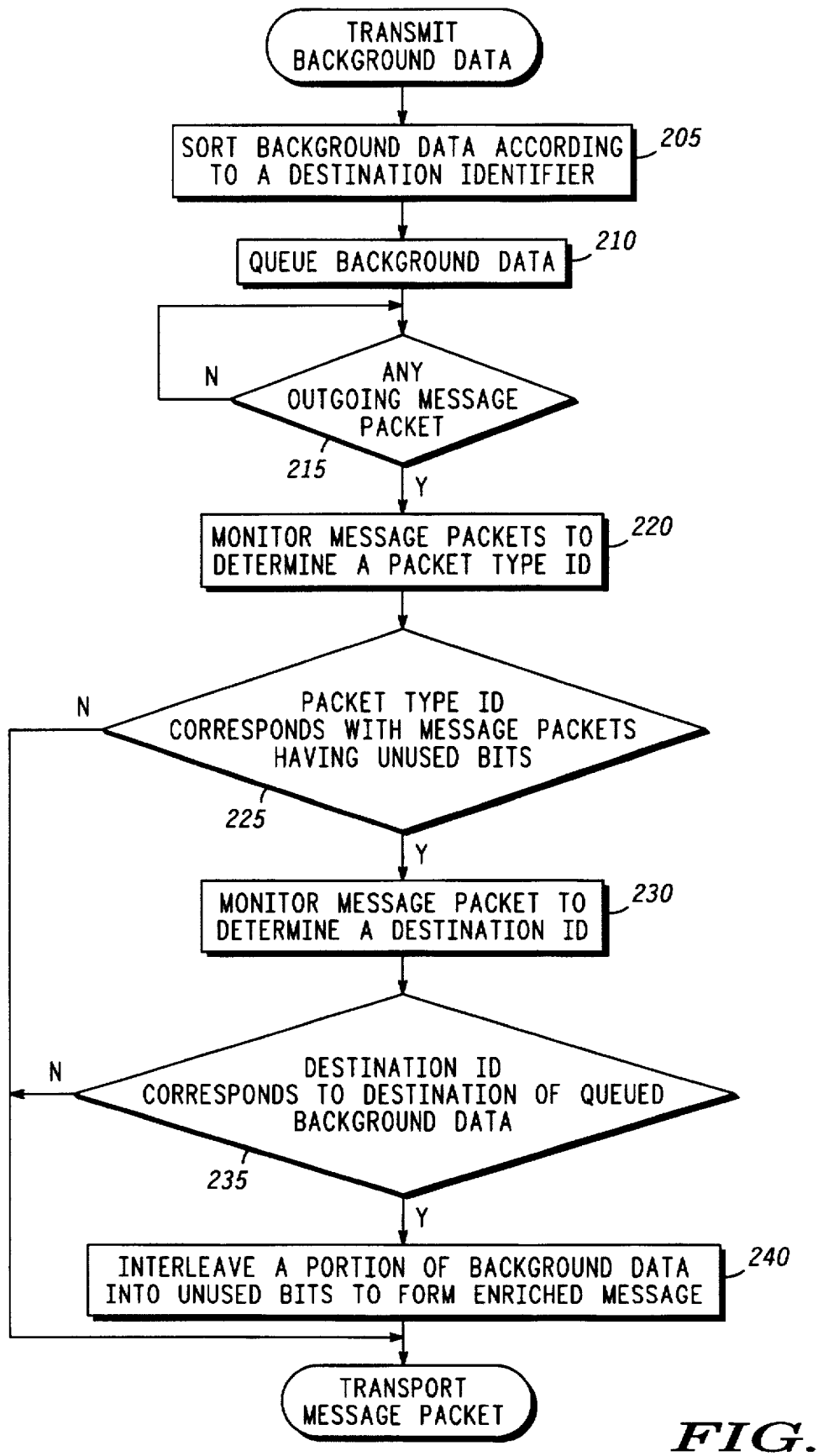
FIG. 2 shows a flowchart of a method for transmitting background data in an existing communication system in accordance with a preferred embodiment of the present invention.
Figure 3:
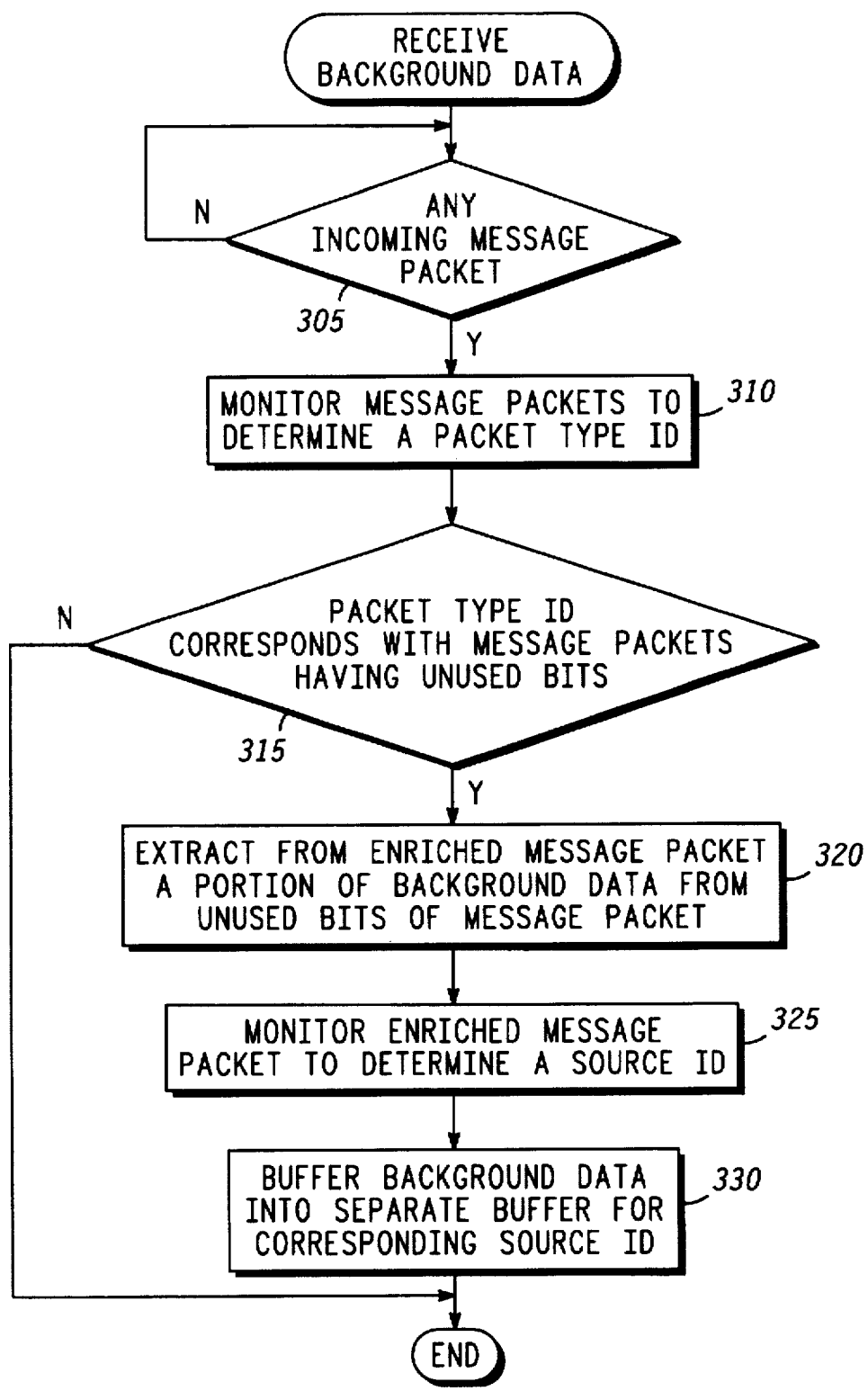
FIG. 3 shows a flowchart of a method for receiving background data in an existing communication system in accordance with a preferred embodiment of the present invention.

A node controller 105 orchestrates, among other things, the methods detailed in FIGS. 2 and 3, and couples electrically to both packet transfer buffer 110 and unused bit catalog 125. Node controller 105 evaluates packet transfer buffer for determining packet identifiers and, in another preferred embodiment, destination identifiers denote addresses of receiving packet network nodes. When background data services occur, node controller 105 retrieves background data from a transmit background data queue 115 in portions corresponding to those number of bits determined in the evaluation of unused bit catalog 125 as indexed by the packet identifier. Transmit background data queue 115 may be any of several formats of memory devices known by those of skill in the art, such as addressable RAM organized as a First In First Out (FIFO) or other stack or queue architecture. Transmit background data queue 115 may be discrete or may also be integrated into node controller 105 as an internal cache or memory.

In another preferred embodiment, transmit background data queue 115 is partitioned into separate queues corresponding to a destination identifier that distinguishes among various receiving packet network nodes to which the message packet is addressed. Techniques for partitioning are known by those of skill in the art.

A receive background data buffer 120 operates when packet network node 100 is receiving enriched message packet 130'. When receiving enriched message packets, node controller 105 extracts background data. The extracted background data is stored and accumulated in receive background data buffer 120 until retrieved by another process not within the scope of the present invention. Receive background data buffer 120 may be structurally similar or identical to transmit background data queue 115. In another preferred embodiment, receive background data buffer 120 is partitioned into separate queues corresponding to a source identifier that distinguishes among the sources of background data.

FIG. 2 shows a flowchart of a method for transmitting background data in an existing communication system in accordance with a preferred embodiment of the present invention. Transmit Background Data Process evaluates message packets, retrieves background data for interleaving when appropriate, and interleaves portions of the background data in preparation for transmission over the packet network.

In another preferred embodiment, a task 205 sorts background data according to a destination identifier. Background data received by packet network node 100 (FIG. 1) is separated into separate queues according to a destination identifier denoting one of a plurality of receiving nodes of the background data.

A task 210 queues background data in transmit background data queue 115 (FIG. 1) until a message packet having the corresponding destination identifier passes through packet network node 100 (FIG. 1). Background data is delivered to packet network node 100 (FIG. 1) for a low data-rate delivery of background data. Because the present invention utilizes unused or reserved bits or null data fields, the bandwidth of data rate transmission is reduced below that of standard payload data. However, the transfer rate approximates the number of usable or vacant bits divided by the total number of payload bits, which yields a ratio of the used to unused bits. This ratio is then multiplied by the bandwidth of standard payload packets.

A query task 215 monitors for a message packet 130 (FIG. 1) to be sent to packet network node 100 (FIG. 1). When a message packet is detected, a task 220 monitors message packet 130 to determine a packet type identifier for message packet 130. A packet type identifier denotes the structure or format of message packet 130 from which vacant or unused bits may be determined into which background data may be interleaved. In another preferred embodiment, determination of unused bits is accomplished by employing a list of message packet types with designations of unused or available bits for carrying background data. Such a preferred embodiment employs unused bit catalog 125 (FIG. 1) for storing lists of message packet types with their available unused bit locations.

A query task 225 determines if the packet type identifier of the present message packet corresponds to message packet types known to have vacant or unused bits. When the packet type identifier of the present message packet corresponds with a packet type having no vacant or unused bits, then message packet 130 (FIG. 1) propagates through packet network node 100 (FIG. 1) unenriched since it has no vacant bits for transporting portions of background data.

In another preferred embodiment, when the packet type identifier of the present message packet corresponds with a packet type identifier known to have at least one unused or vacant bit, then a task 230 monitors message packet 130 (FIG. 1) to determine a destination identifier of message packet 130. A destination identifier denotes the destination of message packet 130 (FIG. 1). A query task 235 determines if background data with a corresponding destination identifier is presently queued in transmit background data queue 115 (FIG. 1). If background data destined for a corresponding destination node is present, then background data is preferentially selected for interleaving into unused or vacant bits of message packet 130 (FIG. 1).

A task 240 interleaves a portion of background data into at least one vacant or unused bit of message packet 130 (FIG. 1) to form enriched message packet 130' (FIG. 1). Enriched message packet 130' propagates in timing and routing in a similar manner as message packet 130; however, in enriched message packet 130', vacant or unused bits transport valid background data.

A transport enriched message packet process relays enriched message packet 130' (FIG. 1) employing standard transmission (e.g., modulation, keying, etc.) processes known to those of skill in the art.

FIG. 3 shows a flowchart of a method for receiving background data in an existing communication system in accordance with a preferred embodiment of the present invention. A receiving packet network node retrieves the portions of background data transmitted in vacant or unused bit positions and combines them from fragmented or portioned background data into entire messages relayed at a lower data rate and transparent to other system components. Only a transmitting and receiving packet network node need perform any additional processing as described in FIGS. 2 and 3 to establish a background data transport service.

When packet network node 100 (FIG. 1) operates in a receive mode, a query task 305 monitors for any message packet. When a message packet is detected, packet transfer buffer 110 (FIG. 1) temporarily delays both enriched message packet 130' and message packet 130. A task 310 monitors the present message packet to determine a packet type identifier. A packet type identifier distinguishes between message packets having vacant or unused bits from message packets having no unused bits for use in transporting background data.

A query task 315 determines if the packet type identifier of the present message packet corresponds to enriched message packet types known to have vacant or unused bits and therefore potential transport locations for background data. When the present message packet was not enriched due to a packet type identifier denoting a message packet having no vacant or unused bits or a lack of background data for low data rate transmission, processing of message packet 130 proceeds normally with the consumption or retransmission of message packet 130.

When query task 315 determines that the packet type identifier of the present packet corresponds to message packets having at least one unused bit, a task 320 extracts portions of background data from the vacant or unused bit locations of enriched message packet 130' (FIG. 1).

In another preferred embodiment, when the packet type identifier of the present message packet corresponds to a packet type identifier known to have at least one unused or vacant bit, then a task 325 monitors enriched message packet 130' (FIG. 1) to determine a source identifier of enriched message packet 130'. A source identifier denotes the source of enriched message packet 130' (FIG. 1). A task 330 buffers the portions of background data in the present enriched message packet 130' (FIG. 1) into a separate receive background data buffer 120 (FIG. 1) designated by the source identifier.

Thus, a method for conveying and recovering background data over an existing packet network that transports a series of message packets, some of which have vacant or unused bits, by monitoring for such message packets has been disclosed.

Also, a method and packet network node for conveying and recovering background data in an existing packet network by monitoring for message packets capable of hosting background data, interleaving a portion of background data into such message packets, and monitoring and extracting portions of background data from enriched message packets have been disclosed.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. In a packet network, a method for conveying and recovering background data over said packet network, said packet network transporting a series of message packets wherein each of said message packets has a format denoted by one of a plurality of packet type identifiers, a portion of said packet type identifier denoting each of said message packets having at least one unused bit, said method comprising the steps of:

(a) monitoring, at a sending node, each of said message packets to determine said packet type identifier;

(b) when said packet type identifier corresponds with said message packet having at least one unused bit, interleaving a portion of said background data into said at least one unused bit to form an enriched message packet by retrieving an unused bit mask from a message packet unused bit catalog as indexed by said packet type identifier;

(c) transporting said enriched message packet to a receiving node;

(d) monitoring, at said receiving node, for said enriched message packet to determine said packet type identifier;

(e) when said packet type identifier corresponds with said message packet having at least one unused bit, extracting said portion of said background data from said at least one unused bit of said enriched message packet; and (f) repeating steps a–e for subsequent portions of said background data.

2. A method as recited in claim 1, further comprising prior to said monitoring at said sending node step, queuing said background data.

3. A method as recited in claim 1, wherein said message packet unused bit catalog comprises a corresponding entry denoting unused bits for each type of said message packets transported through said existing packet network.

4. A method as recited in claim 1, wherein said extracting step further comprises the step of retrieving said unused bit mask from said message packet unused bit catalog as indexed by said packet type identifier.

5. A method as recited in claim 1, wherein said extracting step further comprises the step of buffering said portion and said subsequent portions of said background data.

6. A method as recited in claim 1, further comprising the steps of:

sorting said background data according to a destination identifier denoting one of a plurality of receiving nodes for said background data;

queuing said background data into separate queues according to said destination identifier;

monitoring, at said sending node, each of said message packets to determine said destination identifier; and interleaving said background data from said separate queues having said destination identifiers corresponding to said destination identifiers of said message packets to form said enriched message packets.

7. A method as recited in claim 6, further comprising the steps of:

monitoring, at said receiving node, each of said enriched message packets to determine a source identifier; and when said destination identifier corresponds with said receiving node, buffering said background data into separate buffers according to said source identifier.

8. In a node, a method for conveying and recovering background data transported over an existing packet network, said existing packet network transporting a series of message packets wherein each of said message packets has a format denoted by a packet type identifier, a portion of said packet type identifier denoting each of said message packets having at least one unused bit, said method comprising the steps of:

when said node has said background data for transmission, (a) monitoring each of said message packets to determine said packet type identifier;

(b) when said packet type identifier corresponds with said message packet having at least one unused bit, interleaving a portion of said background data into said at least one unused bit to form an enriched message packet by retrieving an unused bit mask from a message packet unused bit catalog as indexed by said packet type identifier;

when said node receives said enriched message packet,
(c) monitoring each of said enriched message packets to determine said packet type identifier; and
(d) when said packet type identifier corresponds with said message packet having at least one unused bit, extracting said portion of said background data from said at least one unused bit of said enriched message packet.

9. A method as recited in claim 8, further comprising the step of when said node has said background data for transmission, queuing said background data.

10. A method as recited in claim 8, wherein said message packet unused bit catalog comprises a corresponding entry denoting unused bits for each type of message packets transported through said existing packet network.

11. A method as recited in claim 8, wherein said extracting step further comprises the step of retrieving said unused bit mask from said message packet unused bit catalog as indexed by said packet type identifier.

12. A method as recited in claim 8, wherein said extracting step further comprises the step of buffering said portion and subsequent portions of said background data.

13. A method as recited in claim 8, when said node has said background data for transmission, further comprising the steps of:

sorting said background data according to a destination identifier denoting one of a plurality of receiving nodes for said background data;

queuing said background data into separate queues according to said destination identifier;

monitoring, at said node, each of said message packets to determine said destination identifier; and interleaving said background data from said separate queues having said destination identifier corresponding to said destination identifier of said message packets to form said enriched message packets.

14. A method as recited in claim 13, when said node receives said enriched message packet, further comprising the steps of:

monitoring, at said node, each of said enriched message packets to determine said destination identifier; and when said destination identifier corresponds with said node, buffering said background data into separate buffers according to a source identifier.

15. A node for conveying and recovering background data in an existing packet network, said packet network transporting a series of message packets wherein each of said message packets has a format denoted by one of a plurality of packet type identifiers, a portion of said packet type identifier denoting each of enriched message packets having at least one unused bit, said node comprising:

a packet transfer buffer for monitoring each of said message packets and said enriched message packet to determine said packet type identifier;

a node controller coupled to said packet transfer buffer for interleaving a portion of said background data into said at least one unused bit to form an enriched message packet when said packet type identifier corresponds with said message packet having at least one unused bit, and extracting said portion of said background data from said at least one unused bit of said enriched message packet when said packet type identifier corresponds with said message packet having at least one unused bit;

a message packet unused bit catalog coupled to said node controller for retrieving an unused bit mask as indexed by said packet type identifier.

16. A node as recited in claim 15, further comprising:

a transmit background data queue operatively coupled to said node controller for queuing said background data for transmission.

17. A node as recited in claim 15, wherein said unused bit catalog further comprises:

a corresponding entry denoting unused bits for each type of message packets transported through said existing packet network.

18. A node as recited in claim 15, further comprising:

a receive background data buffer operatively coupled to said node controller for buffering said portion and said subsequent portions of said background data.

19. A node as recited in claim 15, wherein said message packets further comprise a destination identifier denoting one of a plurality of receiving nodes for said background data and wherein:

said node controller further sorts said background data according to a destination identifier denoting one of a plurality of receiving nodes for said background data; and said node controller queuing of said background data into separate queues according to said destination identifier, and monitors each of said message packets to determine said destination identifier, and interleaves said background data from said separate queues having said destination identifier corresponding to said destination identifier of said message packets to form said enriched message packets.

20. A node as recited in claim 19, further comprising:

said node controller further monitoring, at said receiving node, each of said enriched message packets to determine said destination identifier; and a receive background data buffer operatively coupled to said node controller for buffering said background data into separate buffers according to a source identifier when said destination identifier corresponds to said receiving node.

* * * * *